(12) United States Patent
Wright

(10) Patent No.: US 12,139,001 B1
(45) Date of Patent: Nov. 12, 2024

(54) FOLDABLE OFF-ROAD ELECTRIC VEHICLE

(71) Applicant: DIMAAG-AI, Inc., Fremont, CA (US)

(72) Inventor: Ian Wright, Woodside, CA (US)

(73) Assignee: DIMAAG-AI, Inc., Fremont, CA (US)

( * ) Notice: Subject to any disclaimer, the term of this patent is extended or adjusted under 35 U.S.C. 154(b) by 0 days.

(21) Appl. No.: 18/523,676

(22) Filed: Nov. 29, 2023

(51) Int. Cl.
| | |
|---|---|
| *B60K 1/04* | (2019.01) |
| *B60G 3/20* | (2006.01) |
| *B60G 13/02* | (2006.01) |
| *B60K 1/02* | (2006.01) |
| *B60K 7/00* | (2006.01) |
| *B60L 50/60* | (2019.01) |
| *B60N 2/30* | (2006.01) |
| *B62D 5/04* | (2006.01) |
| *B60G 11/00* | (2006.01) |

(52) U.S. Cl.
CPC ............. *B60K 1/02* (2013.01); *B60G 3/20* (2013.01); *B60G 13/02* (2013.01); *B60K 1/04* (2013.01); *B60K 7/0007* (2013.01); *B60L 50/60* (2019.02); *B60N 2/30* (2013.01); *B62D 5/0418* (2013.01); *B60G 11/00* (2013.01); *B60G 2200/144* (2013.01); *B60G 2200/422* (2013.01); *B60G 2200/44* (2013.01); *B60G 2202/22* (2013.01)

(58) Field of Classification Search
CPC ......... B60G 3/20; B60G 13/02; B60G 11/00; B60G 2200/144; B60G 2200/422; B60G 2200/44; B60G 2202/22; B60K 7/0007; B60L 50/60; B60N 2/30; B62D 2/0418
See application file for complete search history.

(56) References Cited

U.S. PATENT DOCUMENTS

| | | | |
|---|---|---|---|
| 11,607,952 B1 | 3/2023 | Wright | |
| 11,639,092 B1 | 5/2023 | Wright | |
| 11,648,847 B1 | 5/2023 | Ng et al. | |
| 11,661,117 B2 * | 5/2023 | Formoza | B62D 21/14 180/208 |
| 2011/0276233 A1 * | 11/2011 | Lofstrand | A61G 5/1056 5/608 |
| 2021/0202923 A1 * | 7/2021 | Bender | B60L 50/66 |

OTHER PUBLICATIONS

Wright, Ian et al., "Electrical Vehicles Comprising Power Distribution Systems and Methods of Operating Thereof", U.S. Appl. No. 18/332,979, filed Jun. 12, 2023.

* cited by examiner

*Primary Examiner* — Jason D Shanske
*Assistant Examiner* — James J Triggs
(74) *Attorney, Agent, or Firm* — Polygon IP, LLP

(57) ABSTRACT

A foldable non-highway electric vehicle (EV) for recreational use. The non-highway EV may include a chassis and a foldable battery module coupled to the chassis. The foldable battery module may fold to a position to allow portable transport of the non-highway EV. Suspension may control movement of the wheels relative to the chassis. The suspension may also be set in a plurality of different configurations, including a configuration where the suspension is set in a transport position. With the battery folded and the suspension set in the transport position, the footprint of the non-highway EV may be significantly reduced, to allow for convenient transportation of the non-highway EV.

20 Claims, 12 Drawing Sheets

FOLDABLE OFF-ROAD ELECTRIC VEHICLE

FIELD OF TECHNOLOGY

This patent application relates generally to electric vehicles (EVs), and more specifically to foldable off-road EVs for recreational use.

BACKGROUND

Non-highway vehicles for recreational use, such as bicycles, motorcycles (e.g., dirt bikes), all-terrain vehicles (ATVs), utility terrain vehicles (UTVs), and other such vehicles, are often a smaller size than highway licensed vehicles, such as cars and trucks. As such non-highway vehicles need to be transported by a highway licensed vehicle when on public highways, portability of such vehicles is often critical. Typically, such transport involves the non-highway vehicles being towed to their destinations by a highway licensed vehicle. Towing can be inconvenient for an end user as such vehicles cannot be easily transported with just a highway licensed vehicle and instead needs a trailer and a properly connected hitch. Furthermore, the typical driver may be unfamiliar with the techniques required to properly tow a trailer, leading to potential safety issues.

SUMMARY

Described herein are foldable off-road electric vehicles (EVs). Specifically, the EVs described herein may include a chassis and a foldable battery module coupled to the chassis. The foldable battery module may fold to a position that allows portable transport of the EV. The suspension of the EV may be set in a plurality of different configurations, including a configuration where the suspension is extended downward to reduce the track width of the EV, for transport. The frame of the EV may also be extended, for operation, and retracted, for transport.

Provided is an electric vehicle including a chassis, a first battery module, a first wheel assembly, a second wheel assembly, and a third wheel assembly. The first battery module may be coupled to the chassis and configured to rotate relative to the chassis. The first wheel assembly may be disposed in a first longitudinal position along the chassis and comprise a first suspension, configured to set within one of a first operating range and a first transport position, and a first wheel, coupled to the first suspension. The second wheel assembly may be disposed laterally opposite the first wheel assembly in the first longitudinal position and comprise a second suspension, configured to set within one of a second operating range and a second transport position, and a second wheel, coupled to the second suspension. The third wheel assembly may be disposed in a second longitudinal position along the chassis and comprise a third suspension, configured to set within one of a third operating range and a third transport position, and a third wheel, coupled to the third suspension.

In some examples, the electric vehicle may further comprise a fourth wheel assembly, disposed laterally opposite the third wheel assembly in the second longitudinal position. The fourth wheel assembly may comprise a fourth suspension, configured to set within one of a fourth operating range and a fourth transport position, and a fourth wheel, coupled to the fourth suspension.

In some examples, the operating ranges correspond to ranges of suspension travel when operating the electric vehicle.

In some examples, the first transport position is a fixed position at a limit of droop travel of the first operating range or downward in travel compared to the first operating range.

In some examples, the electric vehicle may further comprise a first axle track, coupled to the chassis and configured to longitudinally translate along the chassis. The first wheel assembly and the second wheel assembly may be coupled to the first axle track.

In some examples, the first suspension comprises a plurality of control arms.

In some examples, the first battery module is configured to rotate between a first orientation and a second orientation, where the second orientation is a downward orientation.

In some examples, the electric vehicle may further comprise a first electric motor, configured to power at least the first wheel. The first electric motor may be a hub integrated electric motor.

In some examples, the first battery module comprises a first foldable seat configured to move between a sitting position and a folded position.

In some examples, the first suspension comprises an upright, a first spring, disposed with the chassis, and a first cable, coupling the upright and the first spring. The first wheel is coupled to the first suspension via the upright. In certain such examples, the first cable is positioned such that upward movement of the upright imparts a tension on the first cable. In certain other examples, the electric vehicle may further comprise a first pulley, coupled to the first cable and configured to change a tension direction of the first cable. In certain such examples, the electric vehicle may further comprise a first rotational damper, coupled to the first pulley and configured to provide damping to rotation of the first pulley. In certain additional examples, the electric vehicle may further comprise a second cable, coupled to the upright. The second cable may be positioned such that downward movement of the upright imparts a tension on the second cable. In certain such examples, the second cable is coupled to a second spring. In certain further examples, the upright comprises a first upright portion and a second upright portion. The first wheel is coupled to the second upright portion and the second upright portion is configured to rotate relative to the first upright portion to cause the first wheel to rotate relative to the first upright portion. In certain such examples, the electric vehicle further comprises a steering servo, coupled to the first upright portion, and an upright linkage, coupled to the steering servo and the second upright portion. The steering servo is configured to, alternatively, extend the upright linkage in a first direction and retract the upright linkage in a second direction, where extending the upright linkage causes the second upright portion to rotate in a first steering direction relative to the first upright portion and retracting the upright linkage causes the second upright portion to rotate in a second steering direction relative to the first upright portion.

In some examples, the first suspension comprises an upright, a drum, a first cable, coupling the upright and the drum, and a second cable, coupling the upright and the drum. The first wheel is coupled to the first suspension via the upright. The first cable is positioned such that upward movement of the upright imparts a tension on the first cable. The second cable is positioned such that downward movement of the upright imparts a tension on the second cable. In certain such examples, the electric vehicle may further comprise a drum servo, configured to rotate the drum in a first rotational direction and a second rotational direction, where rotation of the drum in the first rotational direction causes the upright to raise and rotation of the drum in the second rotational direction causes the upright to lower. In certain additional examples, the electric vehicle may further comprise a spring/damper, coupled to the drum.

These and other embodiments are described further below with reference to the figures.

BRIEF DESCRIPTION OF THE DRAWINGS

The included drawings are for illustrative purposes and serve only to provide examples of possible structures and operations for the disclosed inventive systems, apparatus, methods, and computer program products for a non-highway foldable EV for recreational use. These drawings in no way limit any changes in form and detail that may be made by one skilled in the art without departing from the spirit and scope of the disclosed implementations.

DETAILED DESCRIPTION

Figure 1:
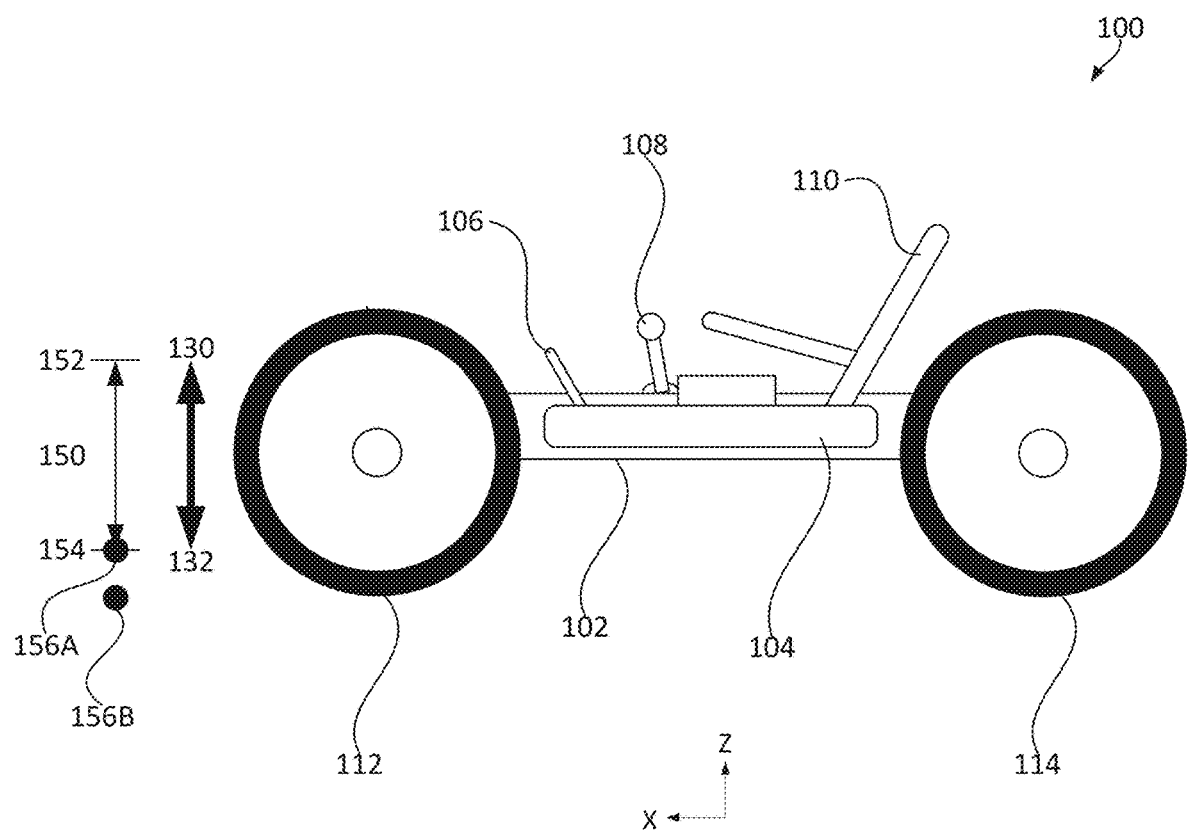
FIG. 1 illustrates a side view of a foldable off-road EV for recreational use in an operational configuration, in accordance with certain embodiments.

In the following description, numerous specific details are outlined to provide a thorough understanding of the presented concepts. The presented concepts may be practiced without some or all of these specific details. In other instances, well-known process operations have not been described in detail to not unnecessarily obscure the described concepts. While some concepts will be described in conjunction with the specific embodiments, it will be understood that these embodiments are not intended to be limiting.

It is to be appreciated that the electric vehicles described herein may include both a left and a right side. In certain figures, for simplicity purposes, element numbers may be provided for only components on one side of the vehicle. However, it is appreciated that such elements, and description provided herein, may also be disposed on the other side of the vehicle (e.g., as illustrated in the accompanying figures). In other figures, both the equivalent left and right components may be provided, such as in FIG. 4. In such figures, elements on one lateral side may include an ordinal indicator and a letter (e.g., "suspension 216A") while the equivalent elements on the other lateral side may include the same ordinal indicator, but a different letter (e.g., "suspension 216B").

It is appreciated that, for the purposes of this disclosure, when an element includes a plurality of similar elements distinguished by a letter following the ordinal indicator (e.g., "suspension 216A" and "suspension 216B") and reference is made to only the ordinal indicator itself (e.g., "suspension 216"), such a reference is applicable to all the similar elements.

As described herein, "coupled to" may refer to an element that is directly or indirectly connected to another element. Such elements may be coupled via any appropriate permanent (e.g., unremovable without destruction), semi-permanent (e.g., removable through removal of other components), and/or temporary (e.g., directly removable) technique. Elements that are coupled together may be coupled in a fixed or movable relationship.

The EV described herein, and components thereof, may be referred to in the coordinate system described herein. That is, positioning of the components of the vehicle may be defined as longitudinally along the X axis shown in the figures, laterally along the Y axis shown in the figures, and height wise along the Z axis shown in the figures.

Introduction

Non-highway vehicles for recreational use, such as bicycles, motorcycles (e.g., dirt bikes), all-terrain vehicles (ATVs), utility terrain vehicles (UTVs), and other such vehicles, are increasingly popular. These non-highway vehicles are often smaller in size than traditional highway licensed vehicles, such as cars and trucks. As users utilize them for utility or recreational purposes, they often have seating areas that are open to the environment. They also typically offer at least one of being lighter, more maneuverable, more capable, or more economical than traditional highway licensed vehicles.

However, as these non-highway vehicles are not street legal, they need to be transported by a highway licensed vehicle when traversing public highways. Typically, such non-highway vehicles are towed to their destinations by a highway licensed vehicle. Towing can be inconvenient for an end user as such vehicles cannot be easily transported with just a highway licensed vehicle. As a proper hitch and trailer are needed for towing, not only is towing inconvenient, but it is also an additional cost and a logistical burden for transport of the non-highway vehicle. Furthermore, many drivers are unfamiliar with towing, leading to increased stress during transport and possible safety concerns.

Certain bicycles may be foldable, but generally the drivetrain and suspension of a four-wheeled vehicle prevents such vehicles from being foldable due to the need for power transmission equipment (e.g., driveshafts), steering equipment (e.g., tie rods), suspension, and other items that are not easily foldable.

Described herein are foldable non-highway EVs for recreational use. Such non-highway EVs may provide low speed transport (e.g., with a top speed below 30 kilometers per hour) over uneven terrain, such as that typically found off-road. For example, the EVs described herein may be configured to be used recreationally in activities such as off-roading, trail driving, rock crawling, and/or other such recreational activities.

The vehicles may include a chassis and a foldable battery module coupled to the chassis. The foldable battery module may fold to a position that allows portable transport of the non-highway EV. In various embodiments, the foldable non-highway EV may include at least three wheels, such as four wheels, with a plurality of axles and one of the axles including at least two oppositely disposed wheels. Suspension may control movement of the wheels relative to the chassis. The suspension may be set in a plurality of different configurations, including a configuration where the suspension may move in an operating range and a configuration where the suspension is set in a transport position. Transport position 156 may be set to allow for the non-highway EV, to be transported in a reduced form factor.

Thus, when the battery is folded to allow portable transport and the suspension is set in transport position 156, the footprint of the non-highway vehicle in at least one dimension (e.g., longitudinally or along the X axis as shown in the figures, laterally or along the Y axis as shown in the figures, and/or height wise or along the Z axis as shown in the figures) may be reduced as compared to when the non-highway EV is configured to be operated. Thus, for example, in the folded configuration, the non-highway EV may be shorter and/or narrower than in the non-folded configuration (which may be suitable for operating the non-highway EV). The reduced form factor may allow for the non-highway EV to be more easily transported, such as allowing for the foldable non-highway EV to be loaded within the interior of a vehicle.

Vehicle Examples

In certain embodiments, the EV described herein may be configured to be moved between at least an "operational configuration" and a "transport configuration." In the operational configuration, the EV may be operated (e.g., driven, ridden, or otherwise operated by a user to provide transport and/or move the user and/or passengers). The transport configuration may be a configuration where the EV is "folded" into a more compact form factor. The more compact form factor may allow for more convenient transport of the EV, such as allowing for the EV to be loaded within the trunk or interior cargo bay of a highway vehicle.

FIG. 1 illustrates a side view of a foldable off-road EV for recreational use in an operational configuration, in accordance with certain embodiments. FIG. 1 illustrates foldable non-highway EV 100. Foldable non-highway EV 100 includes chassis 102, battery module 104, foldable features 106, hand controls 108, foldable seat 110, wheel 112, and wheel 114.

In certain embodiments, foldable non-highway EV 100 may be an EV of approximately 100 to 250 kilograms in unladen weight. Foldable non-highway EV 100 may, in the operational configuration, be between approximately 2000 to 3000 millimeters in length and 1000 to 1800 millimeters in height. When in the transport configuration, foldable non-highway EV 100 may be shorter than the operational configuration by approximately 500 to 1000 millimeters and narrower by approximately 500 to 1000 millimeters. The dimensions provided herein are for illustrative purposes and are not intended to be limiting in any manner.

In various embodiments, chassis 102 may be a structure where various components and/or assemblies of foldable non-highway EV 100 may be coupled to other components (e.g., mounted to in a permanent or semi-permanent manner, such as via fasteners, welding, adhesives, and/or other coupling techniques). In various embodiments, chassis 102 may be a backbone chassis, a spaceframe, a ladder frame, a monocoque, and/or another such chassis appropriate for use with a non-highway EV. In such embodiments, chassis 102 may include various features, such as threaded inserts, rods, tabs, forms, hook and loops, adhesives, pads, and/or other such features for coupling to other components (e.g., for coupling to battery module 104, suspension 216, and/or suspension 218) via, for example, interfacing or receiving other components of foldable non-highway EV 100.

Battery module 104 may be a battery module configured to store and provide electrical energy for operation of foldable non-highway EV 100, as well as receive a charge from a source of electricity. Foldable non-highway EV 100 may include one or more battery modules 104. Battery module 104 may provide electrical power to, for example, power one or more electric motors of foldable non-highway EV 100, such as electric motor 602 shown in FIG. 6, as well other systems of foldable non-highway EV 100 (e.g., control units). In certain embodiments, foldable non-highway EV 100 may include battery modules 104 on each lateral side of chassis 102 (e.g., the left and right sides of chassis 102).

Figure 2:
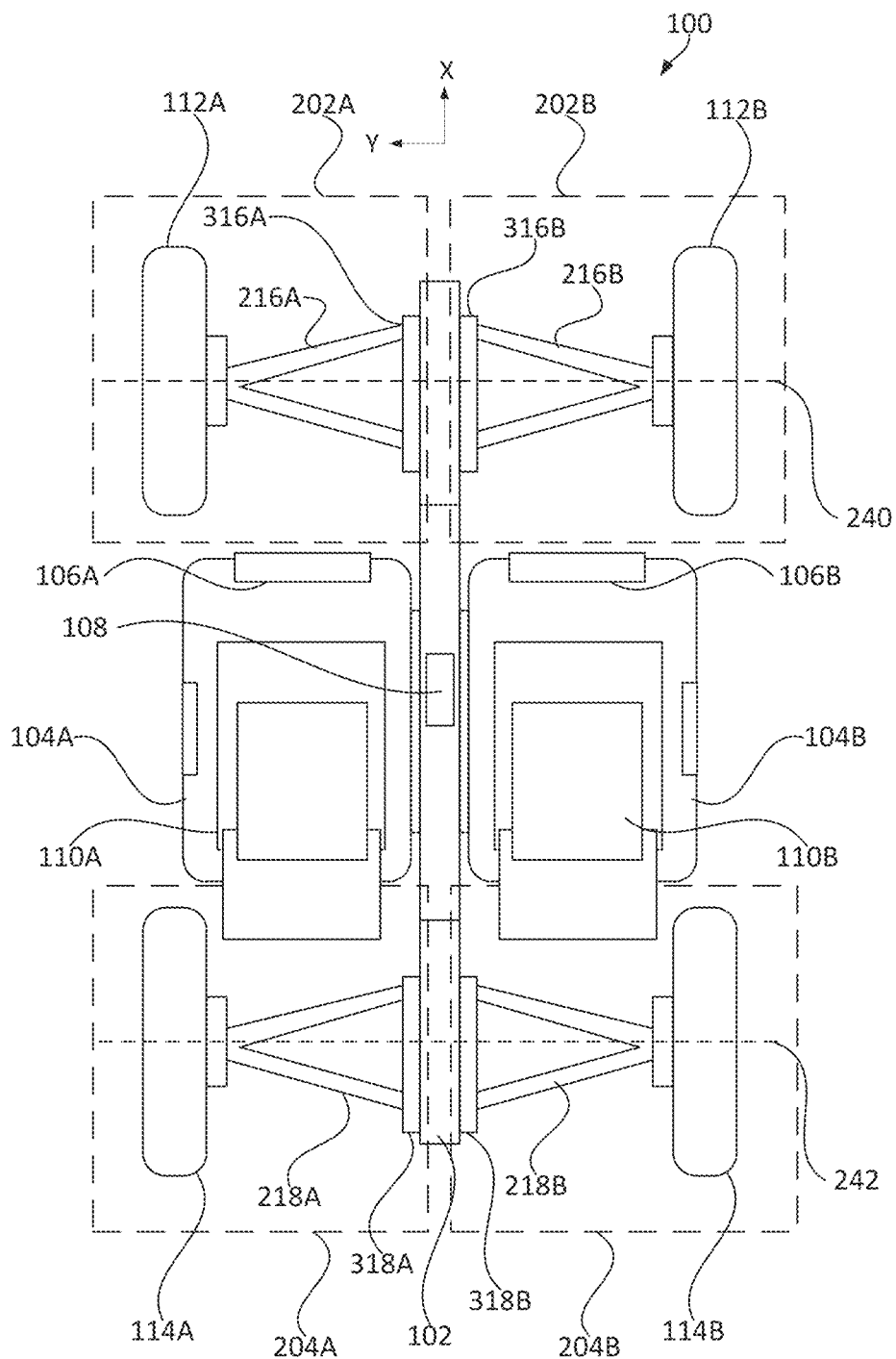
FIG. 2 illustrates a top view of a foldable off-road EV for recreational use in an operational configuration, in accordance with certain embodiments.
Figure 3A:
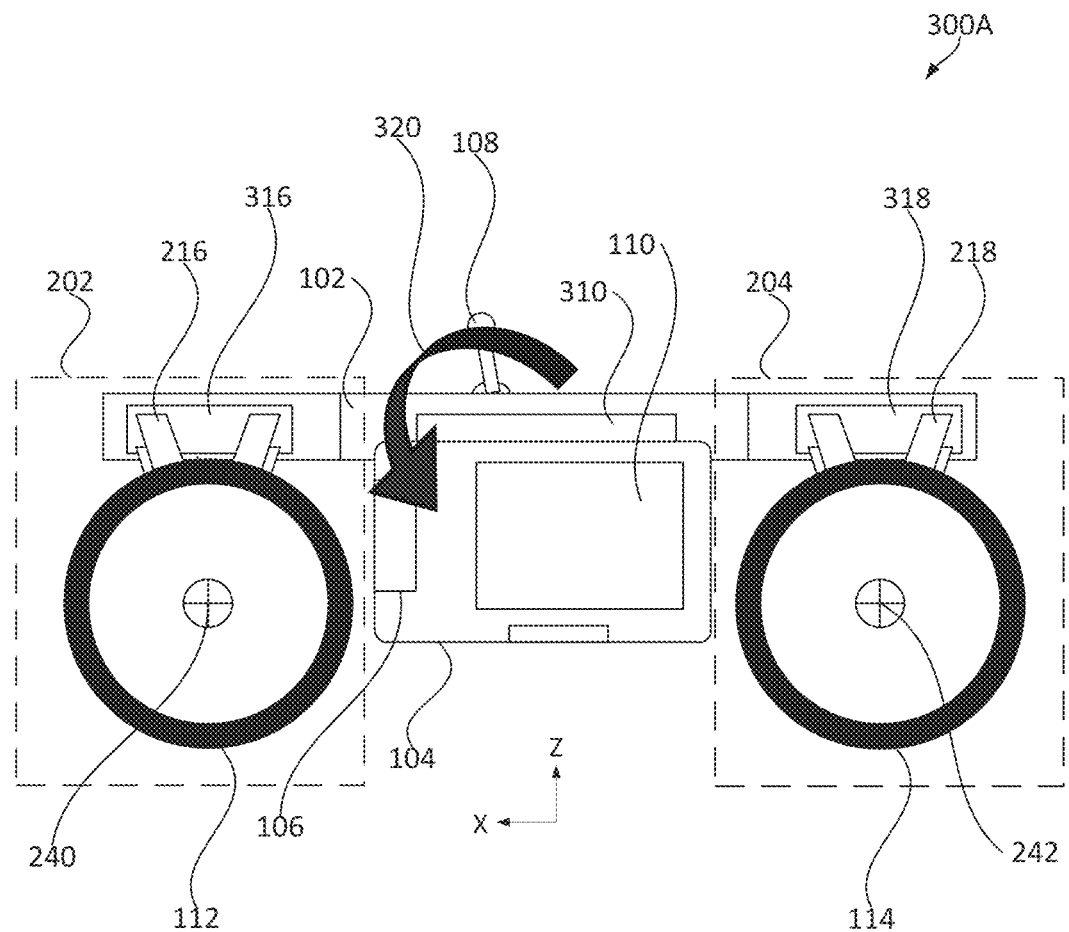
FIG. 3A illustrates a side view of a step within a folding operation for a foldable off-road EV for recreational use, in accordance with certain embodiments.
Figure 3B:
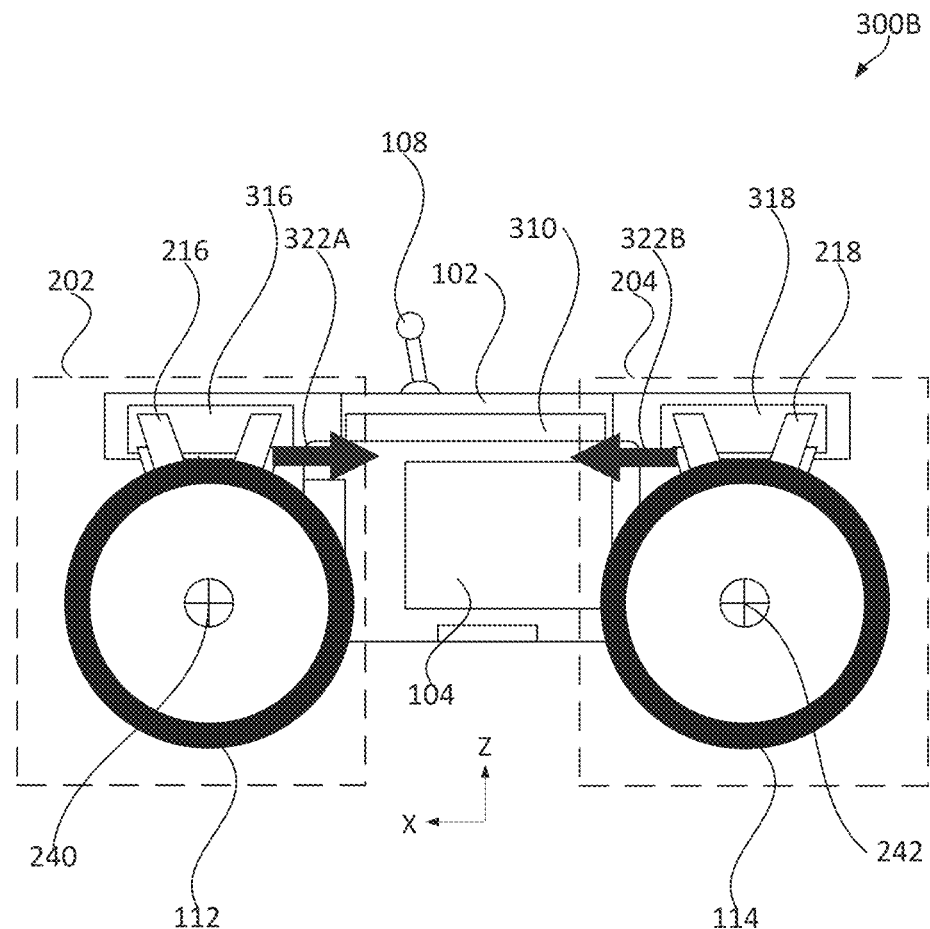
FIG. 3B illustrates a side view of another step within a folding operation for a foldable off-road EV for recreational use, in accordance with certain embodiments.

FIG. 2 illustrates such an arrangement. FIG. 2 illustrates a top view of a foldable off-road EV for recreational use in an operational configuration, in accordance with certain embodiments. As shown in FIG. 2, foldable non-highway EV 100 includes battery modules 104A and 104B (e.g., first battery module 104A and second battery module 104B) on each side of chassis 102. That is, first battery module 104A may be coupled to the left side of chassis 102 and second battery module 104B may be coupled to the right side of chassis 102. Variously, first battery module 104A and second battery module 104B may be coupled to chassis 102 via, for example, first battery hinges 310A and second battery hinges 310B (as shown in FIGS. 3A and 3B), respectively, such that battery hinges 310A and 310B may allow each of the respective battery modules 104A and 104B to rotate relative to chassis 102. That is, the various battery modules 104A and 104B may, when foldable non-highway EV 100 is in the operational configuration, be disposed in a first orientation and, when foldable non-highway EV 100 is in the transport configuration, be disposed in a second orientation.

As described herein, first battery module 104A may be a first battery module while second battery module 104B may be a second battery module battery. Similarly, foldable features 106A, foldable seat 110A, and battery hinge 310A may be first foldable features 106A, first foldable seat 110A, and first battery hinge 310A. Foldable features 106B, foldable seat 110B, and battery hinge 310B may be second foldable features 106B, second foldable seat 110B, and second battery hinge 310B.

The first orientation for a battery module may be, for example, a position where the battery module may be "folded outward" so that, when both battery modules 104A and 104B are folded outward, battery modules 104A and 104B are disposed substantially (e.g., within 30 degrees) in plane of each other. When folded outward, each battery module 104A/B may allow for operators and/or passengers to be seated on the specific battery module (e.g., on foldable seat 110A, which may be a portion of or coupled to the respective battery module 104A) as well as manipulate hand controls 108 (which may be mounted on chassis 102 in between battery modules 104A and 104B). Regardless, the first orientation may be a position for normal operation of foldable non-highway EV 100 (e.g., in the operational configuration).

The second orientation for a battery module may be a position where the battery module is "folded downward" so that the battery module is disposed in a substantially downward orientation (e.g., within 30 degrees of vertically downward). Battery modules 104A and 104B may be disposed in the second orientation when foldable non-highway EV 100 is in the transport configuration.

Movement of battery module 104 to the second orientation is illustrated in FIG. 3A. FIG. 3A illustrates a side view of a step within a folding operation for a foldable off-road EV for recreational use, in accordance with certain embodiments. As shown in FIG. 3A, battery hinge 310 allows battery module 104 to rotate in rotational direction 320 from the first orientation to the second orientation. Additionally, various other embodiments of foldable non-highway EV 100 may be configured to dispose battery module 104 in positions additional to the first orientation and the second orientation.

As shown and described herein, battery module 104 of foldable non-highway EV 100 may include foldable features and foldable seat 110 that are portions of or coupled to the respective battery module. In certain embodiments, the various foldable features 106 and/or foldable seat 110 may be configured to move between a sitting position and a folded position.

In the sitting position, foldable features 106 and/or foldable seat 110 may be extended and/or folded out so that a user may sit within foldable seat 110 and utilize foldable features 106 for bracing, holding, and/or other support aspects. Thus, foldable features 106 may be one or more of a foldable footrest, handle, and/or other item that a user may utilize when operating foldable non-highway EV 100. In the folded position, foldable features 106 and/or foldable seat 110 may be moved to positions so that the outer surface of battery module 104 may present a substantially flush profile. Thus, for example, one or more of foldable features 106 and/or foldable seat 110 may be rotated, translated, and/or both into, for example, cavities that are formed within the outer casing of battery module 104.

Figure 4:
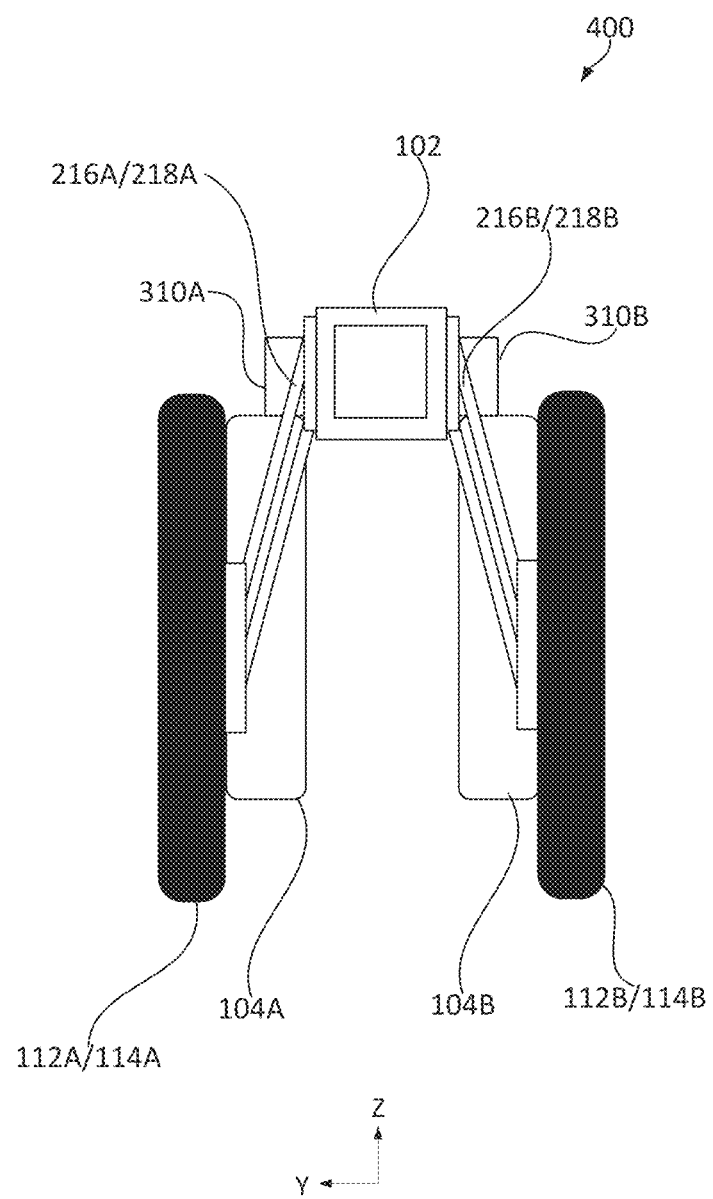
FIG. 4 illustrates a front view of a foldable off-road EV for recreational use in a folded configuration, in accordance with certain embodiments.

FIG. 4 illustrates battery modules 104 when rotated into the downward position. FIG. 4 illustrates a front view of a foldable off-road EV for recreational use in a folded configuration, in accordance with certain embodiments. Foldable non-highway EV configuration 400 of FIG. 4 shows that battery modules 104A and 104B are pointed substantially downward (e.g., within 30 degrees of vertical) when foldable non-highway EV 100 is in transport configuration.

Figure 5A:
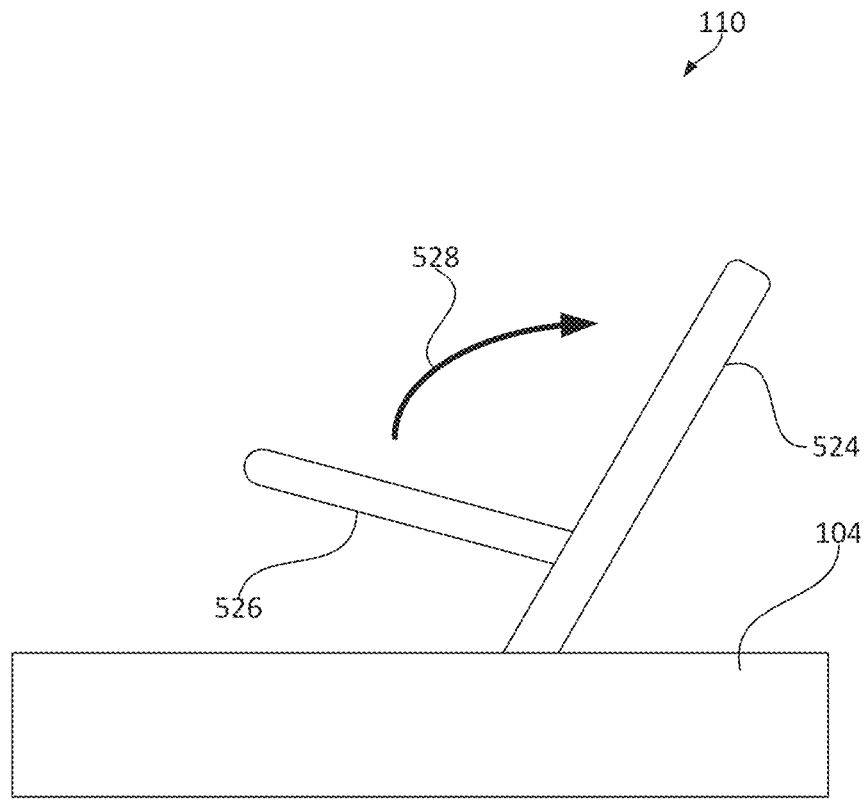
FIGS. 5A and 5B illustrate side views of steps of a folding operation for a seat of a foldable off-road EV for recreational use, in accordance with certain embodiments.
Figure 5B:
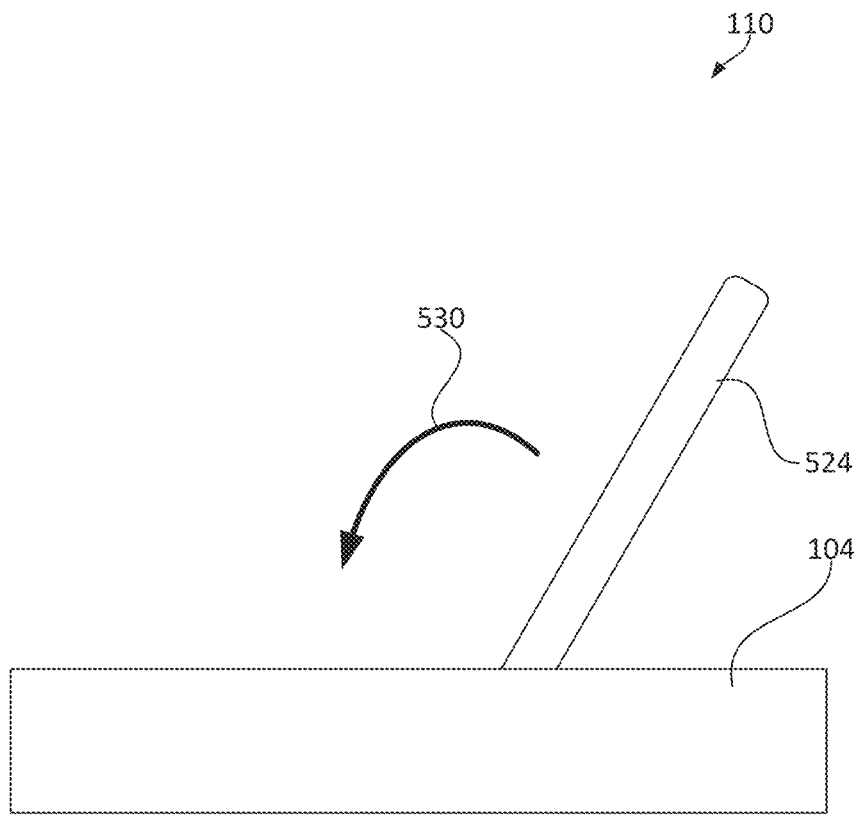

FIGS. 5A and 5B may illustrate the folding operation of a foldable seat 110 of a battery module 104. FIGS. 5A and 5B illustrate side views of steps of a folding operation for a seat of a foldable off-road EV for recreational use, in accordance with certain embodiments. As shown in FIG. 5A, foldable seat 110 may be in a sitting position. Foldable seat 110 includes seatback 524 and seat cushion 526, which may be folded outward (e.g., from battery module 104 and/or from seatback 524) and allows for a user to sit within foldable seat 110. As shown in FIG. 5A, foldable seat 110 may be coupled to battery module 104 and may move relative to battery module 104.

In FIG. 5A, seat cushion 526 of foldable seat 110 may be folded upward in direction 528 towards seatback 524. Thus, seat cushion 526 may be hinged relative to seatback 524 (e.g., a hinge may couple together seatback 524 and seat cushion 526). However, other embodiments may move seatback 524 and/or seat cushion 526 in other manners and/or directions when moving foldable seat 110 from the sitting position to the folded position.

In FIG. 5B, seat cushion 526 may have been folded up against seatback 524, as described in FIG. 5A. In various embodiments, seat cushion 526 may be folded into a cavity of seatback 524 while, in other embodiments, seat cushion 526 may be folded onto the surface of seatback 524 (e.g., seatback 524 may not include a cavity). After seat cushion 526 has been folded up against seatback 524, seat cushion 526 (which includes seatback 524 folded up against seat cushion 526), may then be folded down via direction 530 towards battery module 104. Thus, seatback 524 may be hinged relative to battery module 104 (e.g., a hinge may couple together battery module 104 and seatback 524).

Referring back to FIGS. 1 and 2, FIG. 1 illustrates that foldable non-highway EV 100 may include wheel 112 and wheel 114. In various embodiments, wheel 112 may be a front wheel and tire mounted on the front wheel of foldable non-highway EV 100 and wheel 114 may be a rear wheel and tire mounted on the rear wheel of foldable non-highway EV 100. In various embodiments, wheels 112 and 114 may be the same or of a similar form factor to wheels and tires used for bicycles. In certain embodiments, foldable non-highway EV 100 may be a trike, a four wheel vehicle, or a vehicle with more than four wheels. Wheel 112 may be coupled to chassis 102 via suspension 216 and wheel 114 may be coupled to chassis 102 via suspension 218.

This is further illustrated in FIG. 2. FIG. 2 illustrates that, in a certain embodiment, foldable non-highway EV 100 may include wheel assemblies 202A and 202B for its front axle and wheel assemblies 204A and 204B for its rear axle. Thus, foldable non-highway EV 100 may be a vehicle with two axles, each axle disposed at a different longitudinal position (e.g., a different position along the X axis) of chassis 102. For example, the front axle containing wheels 112A and 112B may be disposed at first longitudinal position 240, while the rear axle containing wheels 114A and 114B may be disposed at second longitudinal position 242.

Each wheel assembly may include a respective wheel and suspension. Thus, for example, first wheel assembly 202A may include first suspension 216A and first wheel 112A, second wheel assembly 202B may include second suspension 216B and second wheel 112B, third wheel assembly 204A may include third suspension 218A and third wheel 114A, and fourth wheel assembly 204B may include fourth suspension 218B and fourth wheel 114B. The wheels and suspensions of the various wheel assemblies may be as described herein.

In various embodiments, wheel 112 and wheel 114 may be moved between, at least an operating range and a transport position by suspension 216 and suspension 218, respectively. By way of example, operating range 150 and transport position 156 is illustrated. Operating range 150 and transport position 156 may be an operating range and transport position for wheel 112, controlled by suspension 216, in certain embodiments. In certain embodiments, wheel 114 controlled by suspension 218 may be configured to be disposed within operating range 150 and transport position 156 or a different operating range and transport position.

In operating range 150, the suspension 216 may allow for wheel 112 to move in response to inputs such as road conditions such as bumps, control inputs (e.g., weight transfer from operation of the vehicle, such as acceleration, deceleration, and/or turning), and/or other such inputs that may result in a reaction from the vehicle. Suspension 218 and wheel 114 may also move in accordance to such inputs. Accordingly, within their respective operating ranges, suspension 216 and suspension 218 may operate as typical vehicle suspension and travel through its compression (e.g., upward) travel range in direction 130 and droop travel (e.g., downward) range in direction 132 in response to inputs to foldable non-highway EV 100. Operating range 150 may include upper operating limit 152, which may be the compression travel limit, as well as lower operating limit 154, which may be the droop travel limit.

Figure 8:
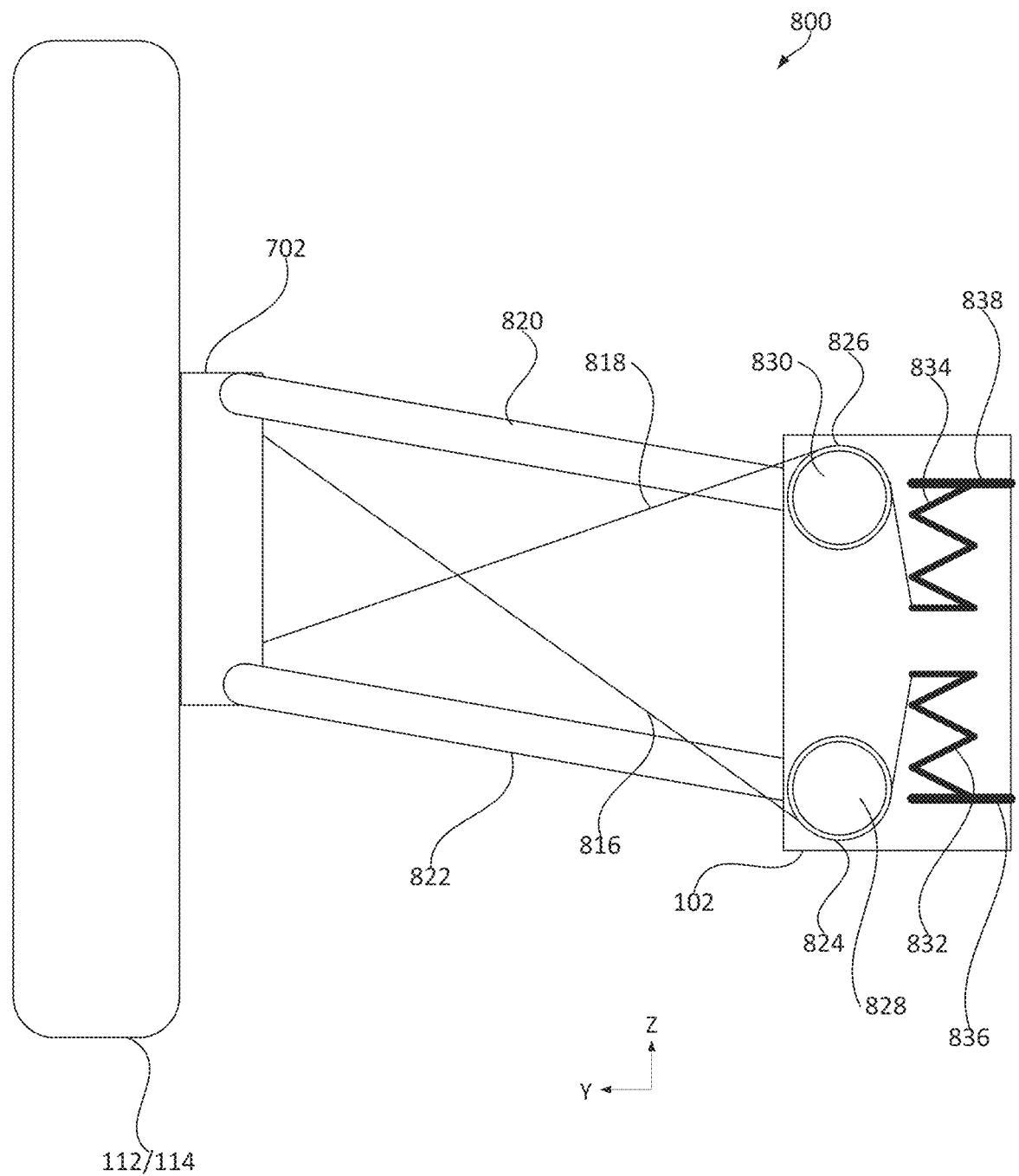
FIG. 8 illustrates a frontal view of a first embodiment of a suspension system for a foldable off-road EV for recreational use, in accordance with certain embodiments.
Figure 9:
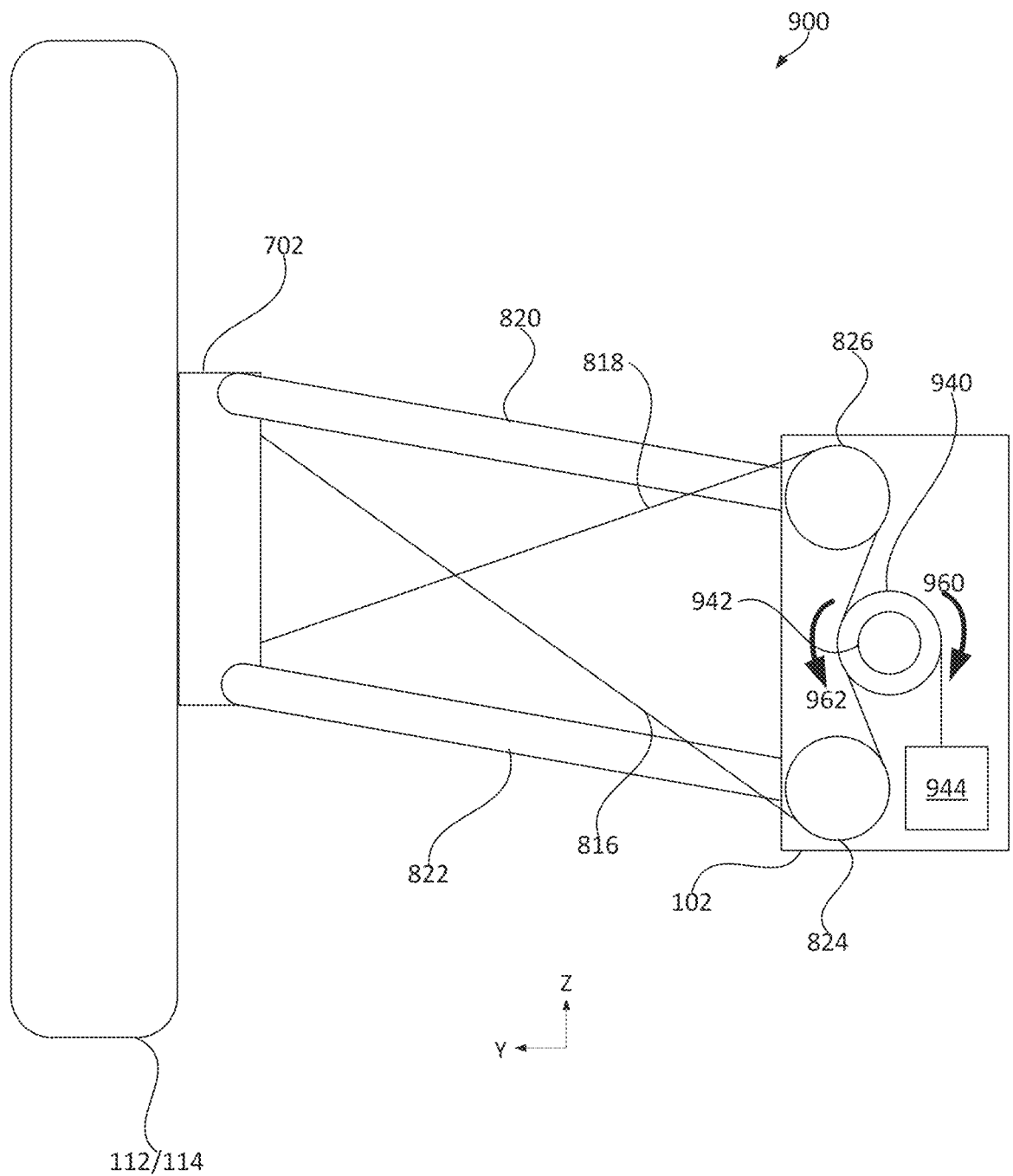
FIG. 9 illustrates a frontal view of a second embodiment of a suspension system for a foldable off-road EV for recreational use, in accordance with certain embodiments.

Movement of suspension 216 and/or suspension 218 may be controlled with various combinations of springs and/or dampers, of any appropriate type that allows for transitioning to transport position 156 from operating range 150. Examples of such arrangements are illustrated in FIGS. 8 and 9.

Transport position 156 may be a position that suspension 216 and/or suspension 218 may be disposed at for transport of foldable non-highway EV 100 (e.g., coinciding with the transport configuration of foldable non-highway EV 100). In various embodiments, the transport position may dispose wheel 112, wheel 114, suspension 216, and/or suspension 218 in a manner that results in a more compact footprint in at least one dimension. Thus, for example, as shown in FIGS. 3A, 3B, and 4, transport position 156 may dispose wheel 112 and wheel 114 in a downward position. In certain embodiments for each axle, such a downward position may be the most downward position within the droop travel of each axle, such as transport position 156A (which corresponds to lower operating limit 154) or a position more downward (e.g., in direction 132) than the limit of droop travel for typical operation during travel, such as transport position 156B, and/or another such position.

Thus, as shown in foldable non-highway EV configuration 400 illustrated in FIG. 4, in transport position 156, suspensions 216A/B and suspensions 218A/B may be disposed downward in a manner that decreases the width of foldable non-highway EV 100. In certain such embodiments, suspensions 216A/B and suspensions 218A/B may be, for example, swing arm, double wishbone, multi-link, or another such suspension configuration that results in changes in track width when cycled through its various positions. Such behavior may result in the track width of foldable non-highway EV 100 significantly decreasing when suspensions 216A/B and suspensions 218A/B are disposed in the transport position and, thus, render foldable non-highway EV 100 more compact for transport when its suspension is in the transport position.

As shown in FIGS. 3B and 4, in the transport position, wheel 112 and wheel 114 may be disposed in a position that still allows for foldable non-highway EV 100 to be rolled when wheel 112 and wheel 114 are in the transport position. In certain embodiments, foldable non-highway EV 100 may still be operated (e.g., by hand controls 108 described herein and/or via remote control or through a user device such as a smartphone via app) to be self-propelled in the transport configuration. Thus, electric motors may still receive power from folded battery module 104 and may provide power to wheel 112 and/or wheel 114. In certain embodiments, the steering control of foldable non-highway EV 100 may also be electrically operated via remote control, according to the techniques described herein. Thus, foldable non-highway EV 100 may be remotely operated without a user seated, to maneuver itself when in the transport configuration, further simplifying transport and loading of the vehicle.

In certain embodiments, suspension 216 and/or suspension 218 may be locked in transport position 156 to prevent movement of suspension 216 and/or suspension 218 and, thus, upward or downward movement of wheel 112 and/or wheel 114, when foldable non-highway EV 100 is being transported. The locking of suspension 216 and/or suspension 218 may be through one or more locking suspension components (e.g., locking dampers or springs), locking bolts, limiting straps, actuators or hydraulics locked in certain positions, and/or other such techniques.

In certain embodiments, one or more of wheel 112 and/or wheel 114 may be powered by an electric motor. The electric motor, such as electric motor 602 described in FIG. 6, may transmit power to wheel 112 and/or wheel 114. Such an electric motor may produce motive power through electrical energy supplied by one or more battery modules 104. In certain embodiments, electric motors may be directly coupled to wheel 112 and/or wheel 114. Directly coupled electric motors may be, for example, electric motors that are coupled to the hubs of wheel 112 and/or wheel 114.

Such a configuration may eliminate the requirement for driveshafts and, thus, allow for wheel 112 and/or wheel 114 to be disposed between both operating range 150 and a transport position. Driveshafts typically have a misalignment range, which may be dictated by the portions of the driveshafts that allow for misalignment (e.g., the constant velocity or CV joint or the universal joint). Thus, driveshafts may limit the angle that suspension 216 and/or suspension 218 may be disposed at and such limitations typically prevent folding of vehicle with three or more wheels. Motors mounted on the hubs of wheel 112 and/or wheel 114, as described herein, may allow for suspension 216 and/or suspension 218 to be disposed at a greater (e.g., more downward) angle when in transport position 156 compared to what is achievable via traditional configurations with driveshafts.

The electric motors may be operated via hand controls 108. In certain embodiments, hand controls 108 may be, for example, a joystick, a lever, a tiller, steering stick, or other hand control that allows for a user to manipulate hand controls 108 in various directions and/or interact with various features (e.g., buttons) on hand controls 108 to provide commands to operate foldable non-highway EV 100. Thus, for example, hand controls 108 may be a joystick that can be pushed in the direction that the operator of foldable non-highway EV 100 wishes to travel (e.g., pushed forward to go forward, pulled backward to brake, and/or pushed to the left or right for steering to the left or right). In certain embodiments, hand controls 108 may be operated even when foldable non-highway EV 100 is in the transport mode (e.g., folded up) in order to move foldable non-highway EV 100 for parking, loading, and/or other such aspects.

In various embodiments, commands received by hand controls 108 may be provided to ECU 606. ECU 606 may determine the user request associated with the commands received by hand controls 108 (e.g., whether to accelerate, decelerate, steer left or right, or maintain the current velocity of foldable non-highway EV 100). ECU 606 may then provide the appropriate operational commands to electric motor 602, drivetrain 604, steering/suspension 610.

In certain embodiments, a forward (or rearward) manipulation of hand controls 108 may cause ECU 606 to instruct electric motor 602 to provide additional motive force (e.g., to accelerate foldable non-highway EV 100). Steering commands, from sideways manipulation of hand controls 108, may be provided to steering/suspension 610, which may steer foldable non-highway EV 100 or otherwise operate the suspension according to the techniques described herein (e.g., according to the techniques of FIG. 7). Furthermore, in certain embodiments, hand controls 108 may be operated for braking force in addition to motive force. Such braking force may be provided by, for example, manipulating hand controls 108 in the opposite manner of that for providing motive force. The braking force may be provided by the electric motors (e.g., through regenerative braking) and/or by friction brakes mounted or coupled to one or more of wheel 112 and/or wheel 114.

In certain embodiments, suspension 216 and suspension 218 may include or be coupled to an axle track. The axle track may be coupled to chassis 102 and be configured to longitudinally translate (e.g., along the X axis) of chassis 102. Thus, for example, suspension 216 (e.g., first suspension 216A and second suspension 216B) may be coupled to axle track 316 and suspension 218 (e.g., third suspension 218A and fourth suspension 218B) may be coupled to an axle track 318. Axle tracks 316 and 318 may allow wheel assembly 202 and wheel assembly 204, respectively, to be disposed at different longitudinal (e.g., X axis) positions along foldable non-highway EV 100, such as along different longitudinal positions along chassis 102, as well as translate to different positions. In certain embodiments, such as that illustrated in FIG. 2, each individual suspension may be coupled to its own axle track (e.g., first suspension 216A coupled to first axle track 316A, second suspension 216B coupled to second axle track 316B, third suspension 218A coupled to third axle track 318A, and fourth suspension 218B coupled to fourth axle track 318B). Other embodiments, such as that illustrated in FIGS. 3A and 3B, may configure the suspension of each axle to couple to a single axle track (e.g., first and second suspension 216A and 216B coupled to first axle track 316 and third and fourth suspension 218A and 218B coupled to second axle track 318).

FIG. 3B further illustrates the operation of an axle track for foldable non-highway EV 100. FIG. 3B illustrates a side view of another step within a folding operation for a foldable off-road EV for recreational use, in accordance with certain embodiments. In FIG. 3B, wheel 112 and wheel 114 may be disposed in transport position 156. Transport position 156 may dispose wheel 112 and wheel 114 in a lowered (e.g., vertically downward position) to reduce the track width of foldable non-highway EV 100. Axle track 316 and/or axle track 318 may then move wheel assembly 202 and/or wheel assembly 204, respectively, toward the center of foldable non-highway EV 100. Thus, axle track 316 may move wheel assembly 202 in direction 322A and axle track 318 may move wheel assembly 204 in direction 322B. As such, axle track 316 may move wheel assembly 202 (e.g., including first wheel assembly 202A and second wheel assembly 202B) to a third longitudinal position 340 and axle track 318 may move wheel assembly 204 (e.g., including third wheel assembly 204A and fourth wheel assembly 204B) to a fourth longitudinal position 342. Accordingly, axle tracks 316 and 318 may move between a position used in the operational configuration and a position used in the transport configuration and form a telescoping chassis.

In the operational configuration, the wheelbase between wheel 112 and wheel 114 may be longer than in the transport configuration, leading to greater stability and the ability for battery module 104 to be folded outward. In the transport configuration, battery module 104 may be folded downward relative to chassis 102 and the wheelbase between wheel 112 and wheel 114 may be shorter.

In various embodiments, axle tracks 316 and/or 318 may include mounting points for elements of the suspension (e.g., the suspension arms and/or the springs/dampers) that may move (e.g., translate tangentially along the X axis) relative to a fixed portion of chassis 102 (e.g., the central portion). Axle tracks 316 and/or 318 may translate through any appropriate technique, such as rails, slots, bearings, and/or other such techniques. In various embodiments, axle tracks 316 and/or 318 may be locked in the various positions described herein.

Additionally, in certain embodiments, suspension 216 and/or suspension 218 may include retractable suspension arms. That is, when suspension 216 and/or suspension 218 are moved to be in transport position 156 (e.g., as shown in FIG. 4), though the width of foldable non-highway EV 100 may be narrower, the height of foldable non-highway EV 100 may increase due to the downward positioning of suspension 216 and/or suspension 218. Suspension arms that retract (e.g., telescope inward) when in transport position 156 may allow for such height increase to be counteracted. With such a suspension configuration, the height increase in the transport configuration for foldable non-highway EV 100 may be mitigated or even eliminated entirely.

Block Diagram Examples

Figure 6:
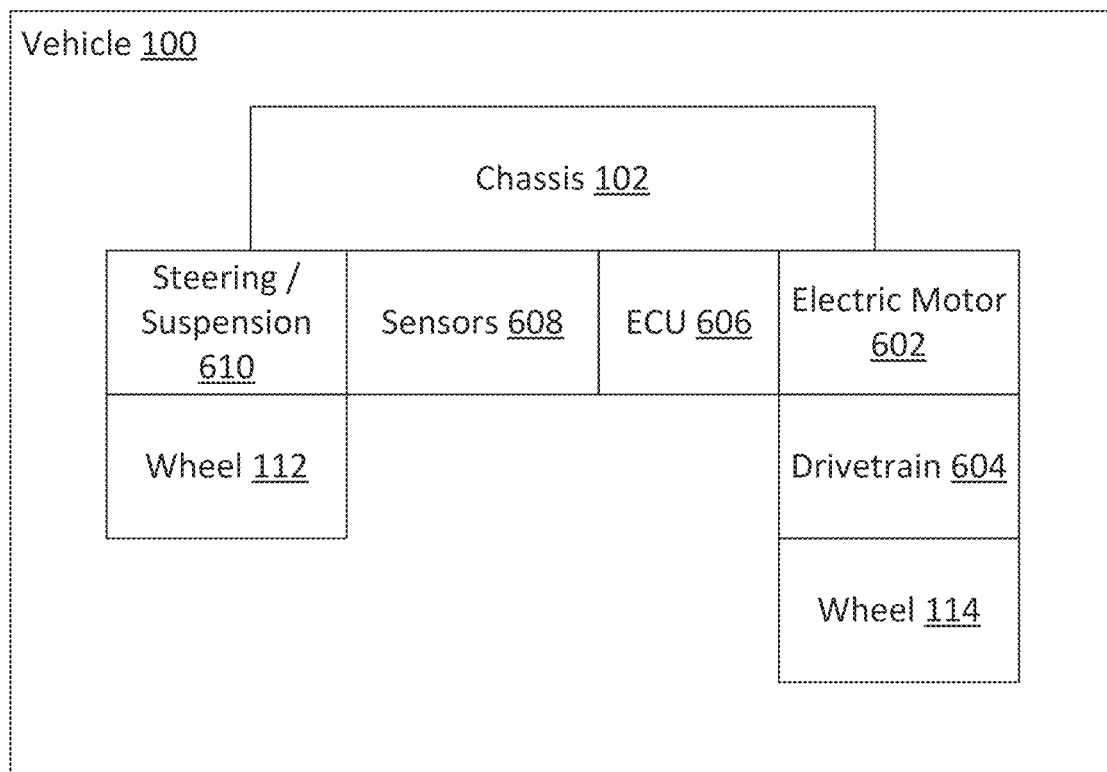
FIG. 6 illustrates a block diagram of a foldable off-road EV for recreational use, in accordance with certain embodiments.

FIG. 6 illustrates a block diagram of a foldable off-road EV for recreational use, in accordance with certain embodiments. FIG. 6 is a block diagram representation of foldable non-highway EV 100. As shown in FIG. 6, foldable non-highway EV 100 may include at least chassis 102, battery module 104, wheel 112, wheel 114, electric motor 602, drivetrain 604, ECU 606, sensors 608, steering/suspension 610. Chassis 102, battery module 104, wheel 112, and wheel 114 may be as described herein. Steering/suspension 610 may include various suspensions (e.g., suspension 216/218) and/or steering systems (e.g., steering system 700) of foldable non-highway EV 100.

Foldable non-highway EV 100 may include one or more electric motors, such as electric motor 602, as well as one or more associated drivetrains for the electric motors, such as drivetrain 604. Electric motor 602 may be an electric motor as described herein. Thus, electric motor 602 may be any type of electric motor that is configured to power and, thus, propel a vehicle such as foldable non-highway EV 100. Thus, electric motor 602 may be, for example, any type of direct current (DC) or alternating current (AC) electric motor that may provide motive force/torque to, for example, wheel 112 and/or wheel 114. The motive force/torque may be transmitted to wheel 112 and/or wheel 114 via drivetrain 604.

Drivetrain 604 may be any drivetrain that may transmit motive force/torque from an electric motor to a wheel. Thus, drivetrain 604 may be a direct drive, a gear reduction, a multi-speed transmission or transaxle, a chain drive, a belt drive, and/or another such power transmission technique. In certain embodiments, electric motor 602 may be an electric motor coupled to the hub or to a wheel and drivetrain 604 may be, for example, the output shaft of electric motor 602 and/or a single speed drive. In other embodiments, drivetrain 604 may be a gear reduction or multi-speed transmission that is coupled to the hub or wheel. In such configurations, each individual electric motor or drivetrain for each wheel may be operated independently or the other electric motors and drivetrains, respectively.

In certain embodiments, a plurality of wheels of EV 100 may each be driven by their own electric motor and/or drivetrain (e.g., first wheel 112A may be driven by a first electric motor and a first drivetrain, second wheel 112B may be driven by a second electric motor and a second drivetrain, third wheel 114A may be driven by a third electric motor and a third drivetrain, and/or fourth wheel 114B may be driven by a fourth electric motor and a fourth drivetrain).

ECU 606 may be one or more computerized control units. ECU 606 may include various circuitry, memories, processors, mechanical devices, and/or software, as described herein, which may be configured to operate aspects of foldable non-highway 100, such as operating the various systems according to the techniques described herein. ECU 606 may include aspects described in FIG. 10.

Sensors 608 may be various sensors configured to operate and/or determine an aspect of the environment around foldable non-highway EV 100. Thus, for example, sensors 608 may include a temperature sensor configured to determine an ambient temperature around EV 100, radar, lidar, and/or visual sensors configured to determine the presence of other vehicle and/or the state of terrain around EV 100 (e.g., for operation of the vehicle, such as operation of steering/suspension 610 and/or electric motor 602), a light sensor to determine the ambient light available, and/or other such sensors. Data from sensors 608 may be communicated to ECU 606. ECU 606 may utilize such data when determining and outputting commands to various systems of EV 100.

Suspension System Examples

Typically, vehicles with three or more wheels include various components for motion control of such wheels that utilizes rods, linkages, telescoping components, and/or other such components. Such motion control components may include steering and suspension systems. The rods, linkages, and/or other such components for motion control typically have maximum angles of deflection, and such components may limit the position that the suspension may be able to achieve, preventing a vehicle from being foldable.

Figure 7:
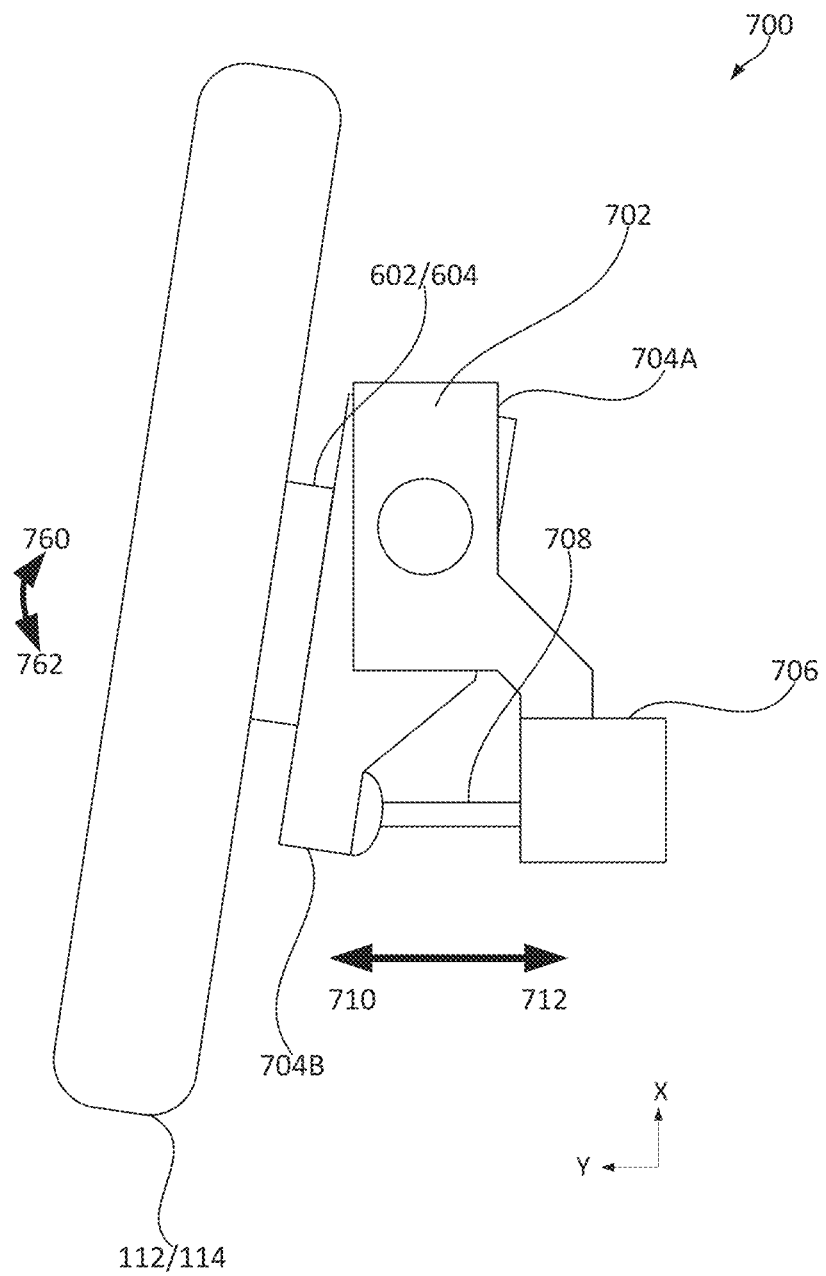
FIG. 7 illustrates a top view of an upright integrated steering system for a foldable off-road EV for recreational use, in accordance with certain embodiments.

FIG. 7 illustrates a top view of an upright integrated steering system for a foldable off-road EV for recreational use, in accordance with certain embodiments. FIG. 7 illustrates steering system 700, which may be a system to individually steer a single wheel/tire assembly of foldable non-highway EV 100, such as wheel 112/114. Though FIG. 7 illustrates a left handed suspension assembly of a foldable non-highway EV, it is appreciated that similar concepts (e.g., a mirrored configuration) may be utilized for a right handed suspension assembly and, indeed, both left and right sided configurations may be utilized for axles of a foldable non-highway EV.

Wheel 112/114, as well as suspension 216/218 (not shown), may be coupled to upright 702. Upright 702 may include first upright portion 704A and second upright portion 704B. In various embodiments, wheel 112/114 may be coupled to second upright portion 704B. Second upright portion 704B may, in certain embodiments, couple to wheel 112/114 via electric motor 602 and/or drivetrain 604, which may be configured to provide motive power for wheel 112/114. Second upright portion 704B may also be rotationally coupled to first upright portion 704A. In various embodiments, first upright portion 704A may be an upright or steering knuckle that interfaces with the suspension arms (e.g., control arms, through one or more joints such as balljoints, bearings, rod-ends, and/or other mechanisms) of a suspension of foldable non-highway EV 100. Second upright portion 704B may be rotationally coupled to first upright portion 704A via a balljoint, bearing, rod-end, and/or other mechanism that allows for second upright portion 704B to rotate relative to first upright portion 704A.

Steering servo 706 may be mounted to first upright portion 704A. In certain such embodiments, steering servo 706 may be mounted to a mounting feature, such as a mounting arm, of first upright portion 704A. Steering servo 706 may be coupled to first upright portion 704A via any appropriate technique, such as via fasteners, adhesives, friction fit, and/or other permanent or semi-permanent coupling techniques. In certain embodiments, steering servo 706 may be mounted to first upright portion 704A via a hinged coupling (e.g., a coupling that may allow the angle that steering servo 706 is disposed of relative to first upright portion 704A to change, such as due to movement of upright linkage 708).

In certain embodiments, steering servo 706 may be, for example, a servo motor, actuator, and/or another such appropriate electric motor. Steering servo 706 may be configured to extend and retract upright linkage 708 in direction 710 and direction 712 (e.g., via a worm gear). Upright linkage 708 may be coupled to second upright portion 704B via a hinged coupling (e.g., the coupling may allow the angle that second upright portion 704B is disposed of relative to upright linkage 708 to change based on the length of extension of upright linkage 708). Extension of upright linkage 708 by steering servo 706 in direction 710 may cause second upright portion 704B and, thus, wheel 112/114 to rotate in first steering direction 760. Retraction of upright linkage 708 by steering servo 706 in direction 712 may cause second upright portion 704B and, thus, wheel 112/114 to rotate in second steering direction 762.

Thus, the configuration of steering system 700 may allow for a steering system contained on the upright/steering knuckle of a foldable non-highway EV, without the need for a steering rack mounted on the chassis. As such, the foldable non-highway EV may be steered without the use of a central steering rack and/or tie rods. Elimination of tie rods may allow for greater travel and/or allow for suspension 216 and/or suspension 218 to be disposed at a greater (e.g., more downward) angle when in transport position 156.

Operation of steering servo 706 may be controlled via electrical and/or data signals from an ECU of the foldable non-highway EV through one or more wired or wireless data connections. Accordingly, operation of hand control 108 may result in the ECU (e.g., ECU 606) of the foldable non-highway EV determining the appropriate response for each steering servo 706 of the vehicle, to the operation of hand control 108. Each steering servo 706 may then be commanded to provide the desired output to steer the foldable non-highway EV in accordance with the operator's commands.

In various embodiments, steering system 700 may be utilized on each individual corner of a single axle or a plurality of axles of foldable non-highway EV 100. Therefore, certain embodiments may allow two wheel steer while other embodiments may allow four wheel steer. Furthermore, each corner may be operated independently from operation of the other corners (e.g., based on commands provided by ECU 606). Thus, the steering angle of each corner may vary based on the determined situation and request of the user and may, in certain situations, may not have a consistent relationship with the steering angles of the other corners, from one steering event to another. Accordingly, foldable non-highway EV 100 utilizing steering system 700 may provide Ackermann steering, reverse Ackermann steering, crabbing, toe in, toe out, and/or other steering controls (e.g., spinning in place) based on the determined situation and user request.

Additionally or alternatively, due to the electric motors that may be mounted on the wheels of opposite lateral sides, the electric motors may be operated to transmit differing amounts of torque to wheels on opposite lateral sides. Doing so may impart a yaw to the foldable non-highway EV 100 via a "tank turn," assisting or wholly causing the foldable non-highway EV to turn, without the wheels providing an actual steering angle.

FIG. 8 illustrates a frontal view of a first embodiment of a suspension system for a foldable off-road EV for recreational use, in accordance with certain embodiments. FIG. 8 illustrates suspension configuration 800, which may suspend wheel 112/114 (e.g., offer spring and/or damping force to wheel 112/114 in one or more directions). The configuration of suspension configuration 800 (and suspension configuration 900) described herein may allow for wheel 112/114 to be suspended without traditional coilovers or externally mounted springs or dampers, allowing for greater suspension travel and/or allowing for suspension 216 and/or suspension 218 to be disposed at a greater (e.g., more downward) angle when in transport position 156. For example, in transport position 156, first cable 816 and/or second cable 818, as they are non-rigid materials, may be collapsed, allowing for a more compact transport mode configuration of the foldable non-highway EV.

As shown in FIG. 8, first cable 816 may suspend wheel 112/114. Wheel 112/114 may be coupled to upright 702. The positioning of upright 702 may be controlled by control arm 820 and control arm 822. While a double control arm configuration, such as an equal length double control arm configuration, is described herein, it is appreciated that other suspension configurations may be utilized, such as swing arm, multi-link, and/or other appropriate configurations.

First cable 816 and second cable 818 may be coupled to upright 702 through any appropriate permanent or semi-permanent connection. First cable 816 and/or second cable 818 that may impart tension force in a single direction and is otherwise non-rigid in other directions. As first cable 816 and second cable 818 may be configured to impart tension force when upright 702 travels in different directions, first cable 816 and second cable 818 may be coupled to upright 702 at different positions, as shown.

A pulley system to control first cable 816 and/or second cable 818 may be disposed within chassis 102. First pulley 824 may be a pulley accommodating first cable 816 and second pulley 826 may be a pulley accommodating second cable 818. The pulley systems may allow for first cable 816 and/or second cable 818 to be coupled to first spring 832 and/or second spring 832, respectively, by, for example, changing the force direction (e.g., tension direction) of first cable 816 and/or 818.

In various embodiments, first spring 832 and/or second spring 832 may be any appropriate springing element, such as coil springs, torsion bars, leaf springs, hydraulics, and/or other such elements. First spring 832 and second spring 832 may be securely coupled to chassis 102 by coupling to first mount 836 and second mount 838, respectively, which may be any appropriate surface or mounting technique that may be secure (e.g., pin) an end of first spring 832 and second spring 832, respectively. Separate springs 832 and 834 may allow for different amounts of spring rates to be provided for compression and rebound travel. It is appreciated that, while the configuration of suspension configuration 800 utilizes first pulley 824 and/or second pulley 826 for greater control, other configurations may not include such pulleys.

Variously, upward movement of upright 702 may be sprung (e.g., provide an opposite direction force) by first cable 816 and downward movement of upright 702 may be sprung by second cable 818. That is, upward movement of upright 702 (e.g., down to bump or weight transfer) may cause a pulling force to be imparted on first cable 816 and first cable 816 may, thus, operate as a unidirectional pullrod when upright 702 is moving upward. Due to the configuration of first cable 816, the pulling force may be resisted by first spring 832. Similarly, downward movement of upright 702 may cause a pulling force to be imparted on second cable 818, which may be resisted by second spring 832. Second cable 818 may thus operate as a unidirectional pullrod when upright 702 is moving downward.

Accordingly, first cable 816, first pulley 824, and first spring 832 may provide springing in response to upward motion of upright 702 and second cable 818, second pulley 826, and second spring 832 may provide springing in response to downward motion of upright 702. In certain embodiments, as tension from second cable 818 may prevent upright 702 from being disposed downward to transport position 156, second cable 818 may be configured to be quickly disconnectable from upright 702 (e.g., via quick disconnect bolts, pins, and/or other mechanical fastening techniques).

Furthermore, damping control may be provided via any appropriate damper that may be coupled to first pulley 824, second pulley 826, first spring 832, and/or second spring 832. Such dampers may include, for example, telescoping dampers as well as lever dampers, viscous dampers, friction dampers, and/or other dampers in other such configurations. For example, dampers coupled to first spring 832 and/or second spring 832 may provide damping to linear motion of first spring 832 and/or second spring 832, respectively, while dampers coupled to first pulley 824 and/or second pulley 826 may provide damping in response to angular motion of first pulley 824 and/or second pulley 826, respectively. Thus, for example, first damper 828 may be a damper coupled to first pulley 824 that is configured to damp rotation of first pulley 824 while second damper 830 may be a damper coupled to second pulley 826 that is configured to damp rotation of second pulley 826.

Variously, first pulley 824, second pulley 826, first damper 828, second damper 830, first spring 832, second spring 832, first mount 836, and second mount 838 may be disposed within a cavity of chassis 102. In certain embodiments, only first cable 816, and its associated components, may be used to impart spring rate to upright 702. Such a configuration provides resistance against upward movement (e.g., compression travel) of upright 702 (e.g., due to static vehicle weight or bump force), allowing for the foldable non-highway EV to maintain ride height. Such a configuration may not provide springing and/or damping to downward movement (e.g., rebound travel) of upright 702, but may simplify the construction of the foldable non-highway EV and, as the foldable non-highway EV is intended to be operated at low speeds, the lack of rebound control may be acceptable.

FIG. 9 illustrates a frontal view of a second embodiment of a suspension system for a foldable off-road EV for recreational use, in accordance with certain embodiments. FIG. 9 illustrates suspension configuration 900, which may be an alternative configuration of suspension configuration 800. Suspension configuration 900 similarly utilizes first cable 816 and first pulley 824 as well as, in some embodiments, second cable 818 and second pulley 826 to provide control of upright 702 for compression and rebound.

In the configuration of suspension configuration 900, first cable 816 and second cable 818 may both be coupled to drum 940, which may be a drum that couples to ends of both first cable 816 and second cable 818. Variously, first cable 816 and/or 818 may be coupled and/or decoupled from upright 702 through any appropriate means. Decoupling of first cable 816 and/or 818 may remove resistance against movement of upright 702 in a specific direction. Springing and/or damping of drum 940 and, thus, first cable 816 and second cable 818, may be provided by a single spring and/or a single damper, such as spring/damper 944. Spring/damper 944 may be any appropriate spring and/or damper described herein.

Furthermore, movement of drum 940 may be controlled by drum servo 942, which allows for active control of first cable 816 and second cable 818 and, thus, active control of the movement of upright 702. Drum servo 942 may be an electric motor or servo that may rotate drum 940 based on operator commands or determinations by various sensors and/or ECUs of the foldable non-highway EV (e.g., sensors 608 and/or ECU 606). Drum servo 942 may include any appropriate gearing to provide sufficient gear reduction for drum servo 942 to operate drum 940.

Thus, for example, an operator may provide instructions (e.g., via hand controls 108 and/or various other control input techniques, such as buttons mounted on the vehicle and/or through a third party device such as a smartphone) to lift one or more wheels, which may be provided by the configuration of suspension configuration 900. Additionally or alternatively, ECU 606 may determine, from data from sensors 608, the presence of one or more obstacles (e.g., rocks or drop offs) in the path of travel of the vehicle. Based on such a determination, the ECU 606 may operate suspension configuration 900 to lift or drop a wheel, as needed, through commanding drum servo 942 to rotate in the appropriate direction. Thus, for example, if ECU 606 determines, from various sensors 608 (e.g., wheelspin sensors, visual sensors, load cells, etc.) that one of the wheels on an axle is lifted, ECU 606 may cause the respective drum servo 942 of that wheel to lower the wheel and, thus allow for traction to be maintained by all wheels of the vehicle. As another example, if ECU 606 determines that there is a large rock in front of one of the wheels, that would be hard to climb through rotation of the wheel by itself, ECU 606 may cause the respective drum servo 942 of that wheel to lift, allowing for the wheel to more easily traverse the obstacle. ECU 606 may also operate all drum servos of the vehicle simultaneously to provide a more level ride while traversing the rocks, or maximize the amount of lift that the corner is able to achieve.

Based on the direction of rotation of drum 940 by drum servo 942, tension force may be imparted via either first cable 816 or second cable 818, causing upright 702 and, thus, wheel 112/114 to either lift or lower, regardless of the underlying terrain underneath wheel 112/114 and/or the weight transfer condition of the foldable non-highway EV (e.g., one wheel lift due to terrain). For example, rotation of drum 940 in direction 960 may cause upright 702 to lift while rotation of drum 940 in direction 962 may cause upright 702 to lower.

In certain embodiments, drum servo 942 may provide resistance against movement of drum 940 and, thus, provide damping to drum 940. Thus, drum servo 942 may provide regenerative braking from movement of drum 940, resisting movement of drum 940. Furthermore, electrical energy may be provided to drum servo 942 to further resist movement of drum 940. Additionally or alternatively, drum servo 942 may provide torque to drum 940 in a manner that provides an opposite force against the tension of first cable 816 or 818. Such torque may function as a springing component, allowing for drum servo 942 to serve as a spring. Drum servo 942 may be accordingly operated in a manner where the spring rate provided by the torque may vary, based on operating situations and operator inputs. Thus, for example, operation of drum servo 942 may be in response to inputs received from hand controls 108 as well as data from various sensors.

As such, full active control of one or more corners of the foldable non-highway EV may be provided through the configuration of suspension configuration 900. Such control may, for example, allow for each wheel to be lifted over obstacles, such as rocks, when traversing terrain (e.g., during rock crawling).

In certain embodiments, the suspension configurations of FIGS. 7-9 may provide for control over the weight load of each individual wheel of a foldable off-road EV for recreational use. The weight of a vehicle is supported by the wheels. That is the combined weight load on the wheels of the vehicle equals the total weight of the vehicle. Depending on the terrain that the vehicle is traveling on, the acceleration of the vehicle, and other factors, the weight load on each individual wheel may vary. Traction for each individual wheel depends on the weight load on the wheel. Typically, the greater the weight load on a wheel, the greater the traction.

When operating a vehicle off-road, the terrain that the vehicle is traveling on is often uneven. Getting sufficient traction for each individual wheel to allow the wheel to provide proper motive force (e.g., acceleration, braking, or steering force) may be a challenge. For example, one wheel may be in a hole while another is over a rock. Though ideally even downforce would be maintained on all of the wheels of a vehicle regardless of travel, typical vehicle suspensions result in varying wheel loads depending on the state of suspension travel.

For example, a typical suspension utilizing springs with a rate of 100 pounds per inch requires 100 pounds of load on the spring to compress the spring by one inch. Such a suspension may result in three inches of compression of the spring at static ride height of the vehicle. If so, droop of the spring by three inches (e.g., if the wheel is disposed over a hole) will completely unload the wheel and result in no downforce on that wheel and, thus, no traction on that wheel. The load that is typically supported by the wheel will be supported by the other wheels of the vehicle (that is, the 300 pounds of downforce will be distributed to the other wheels). Therefore, travel of the suspension, either in compression or droop, will necessarily result in changes in the load of the wheel supported by the suspension.

With such a typical sprung suspension setup, softer springs will result in greater travel and less traction change per wheel per unit distance of suspension travel. However, the softer springs will result in greater sensitivity to load, greater dynamic movement (and, thus, less confidence inspiring handling), and greater likelihood of hitting the limits of travel unless the travel is commensurately increased in relation to the decrease in spring rate.

The suspension configurations of FIGS. 7-9 allow for control of the position of each suspension corner independent from the load borne by the wheel of the corner. Therefore, servo 942 may allow for control of the wheel position while allowing for the same spring force regardless of the position. Thus, for example, servo 942 may allow for a consistent amount of tension to be maintained within first cable 816 and/or second cable 818. Thus, when the wheel moves through its travel range due to the underlying terrain, servo 942 may be operated to adjust position of the wheel 112/114 in response to the terrain while maintaining the same tension on first cable 816 and/or second cable 818 and, thus, the same effective spring rate and same wheel downforce.

Servo 942 may vary the tension on one or both of first cable 816 and second cable 818 in order to decrease and/or increase the spring rate (e.g., in response to commands provided by ECU 606 based on, for example, vehicle speed) and, thus, the stiffness of the suspension and the handling imparted by the suspension. Furthermore, ECU 606 may be configured to respond to the position of wheel 112/114 to, for example, vary the spring rate in a linear or non-linear manner (e.g., in response to travel) through operation of servo 942. In certain embodiments, servo 942 may be operated to provide for both active ride height and spring rate control. For example, individual corners of the vehicle may be operated to change the tensions of the respective cables and, thus, the individual spring rate of the corners. Tensions of opposite or cross corners may be adjusted to vary the weight load borne by opposite corners of an axle and/or the cross weight of a vehicle (e.g., similar to techniques used for corner balancing). Such techniques may allow for the adjustment of the weight borne by the individual wheels of the vehicle while accommodating different travel positions by, for example, independently setting the lengths of first cable 816 and second cable 818 and controlling the tensions of first cable 816 and second cable 818. Additionally or alternatively, operation of servo 942 may result in change of suspension attitude in dynamic situations. For example, servo 942 for each individual wheel may be operated to change the effective spring rate and/or static ride height setting of each corner to reduce roll, result in zero roll, or result in negative roll. Furthermore, servo 942 may control tension of first cable 816 and/or second cable 818 in a manner that provides damping of suspension movements (e.g., by increasing tension on the cable opposite to the direction of movement of the suspension, thus, pulling upward when wheel 112/114 is moving downward or vice versa).

Variously, servo 942 may not provide control when the vehicle is powered off. In such embodiments, suspension 700/800/900 may further include a spring to support the vehicle when servo 942 is powered off. Such a spring may be any conventional spring, such as a coil spring, leaf spring, torsion bar, or other such spring, that may be mounted to any position within suspension 700/800/900. Servo 942 may then be configured to operate first cable 816 and/or second cable 818 in a manner to add or subtract rate to such a spring to provide the same independent control over the spring rate and/or wheel position as described herein, even with the addition of a conventional spring.

Computer Architecture Example

Figure 10:
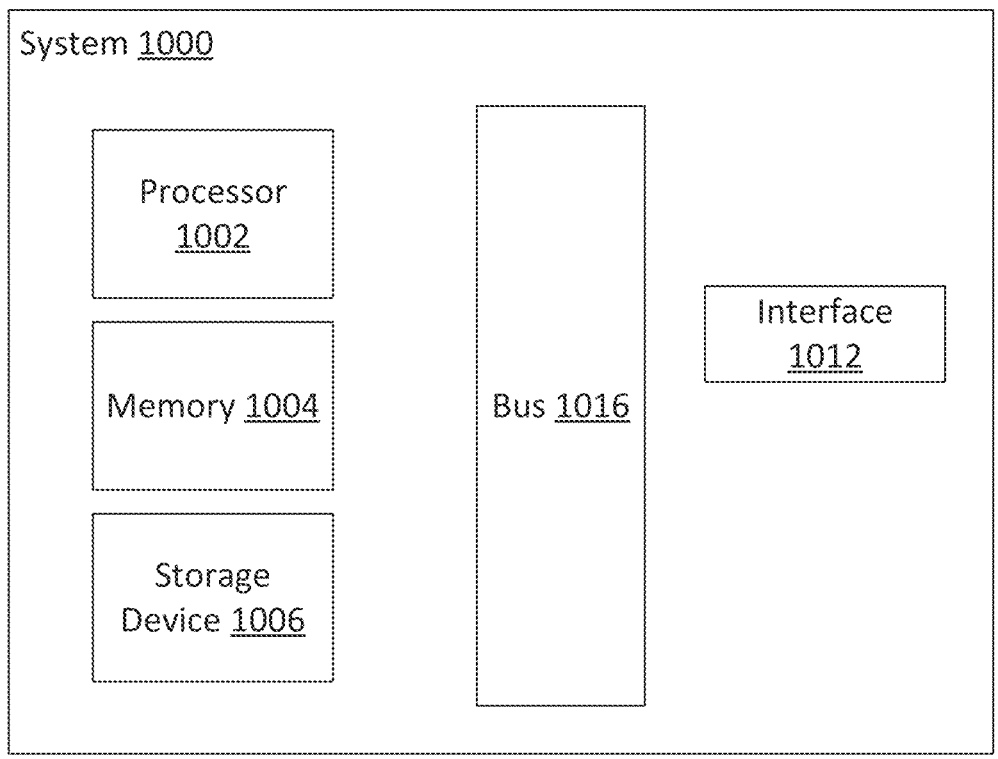
FIG. 10 illustrates a block diagram of a computing system, in accordance with certain embodiments.

FIG. 10 illustrates a block diagram of a computing system, in accordance with certain embodiments. FIG. 10 illustrates system 1000, which may be a computing system for use within one or more ECUs of vehicle 100, such as ECU 606. According to various embodiments, system 1000 suitable for implementing ECUs includes processor 1002, memory 1004, storage device 1006, interface 1012, and bus 1016 (e.g., a PCI bus or other interconnection fabric.) System 1000 may operate as variety of electric devices, such as control units (e.g., ECUs).

Although a particular configuration is described, a variety of alternative configurations are possible. Processor 1002 may perform operations such as those described herein. Instructions for performing such operations may be embodied in memory 1004, on one or more non-transitory computer readable media, or on some other storage device. Various specially configured devices can also be used in place of or in addition to processor 1002. Interface 1012 may be configured to send and receive data packets over a network. Examples of supported interfaces include, but are not limited to CAN bus and other vehicle data standards. These interfaces may include ports appropriate for communication with the appropriate media. They may also include an independent processor and/or volatile RAM. A computer system or computing device may include or communicate with a monitor, touchscreen, user interface, or other suitable display for providing any of the results mentioned herein to a user.

CONCLUSION

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of a non-highway foldable EV. However, the techniques of the present invention apply to a wide variety of EVs. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. An electric vehicle, comprising:
    a chassis;
    a first battery module, coupled to the chassis and configured to rotate relative to the chassis;
    a first wheel assembly, disposed in a first longitudinal position along the chassis, the first wheel assembly comprising:
        a first suspension, configured to set within one of a first operating range and a first transport position, wherein the first transport position is a fixed position at a limit of droop travel of the first operating range or downward in travel compared to the first operating range; and
        a first wheel, coupled to the first suspension;
    a second wheel assembly, disposed laterally opposite the first wheel assembly in the first longitudinal position, the second wheel assembly comprising:
        a second suspension, configured to set within one of a second operating range and a second transport position; and
        a second wheel, coupled to the second suspension; and
    a third wheel assembly, disposed in a second longitudinal position along the chassis, the third wheel assembly comprising:
        a third suspension, configured to set within one of a third operating range and a third transport position; and
        a third wheel, coupled to the third suspension.

2. The electric vehicle of claim 1, further comprising:
a fourth wheel assembly, disposed laterally opposite the third wheel assembly in the second longitudinal position, the fourth wheel assembly comprising:
a fourth suspension, configured to set within one of a fourth operating range and a fourth transport position; and
a fourth wheel, coupled to the fourth suspension.

3. The electric vehicle of claim 1, wherein the first operating range corresponds to a range of suspension travel when operating the electric vehicle.

4. The electric vehicle of claim 1, wherein the first suspension comprises a plurality of control arms.

5. The electric vehicle of claim 1, wherein the first battery module is configured to rotate between a first orientation and a second orientation, wherein the second orientation is a downward orientation.

6. The electric vehicle of claim 1, further comprising:
a first electric motor, configured to power at least the first wheel, wherein the first electric motor is a hub integrated electric motor.

7. The electric vehicle of claim 1, wherein the first battery module comprises:
a first foldable seat, wherein the first foldable seat is configured to move between a sitting position and a folded position.

8. An electric vehicle, comprising:
a chassis;
a first battery module, coupled to the chassis and configured to rotate relative to the chassis;
a first wheel assembly, disposed in a first longitudinal position along the chassis, the first wheel assembly comprising:
a first suspension, configured to set within one of a first operating range and a first transport position; and
a first wheel, coupled to the first suspension, wherein the first suspension comprises:
an upright, wherein the first wheel is coupled to the first suspension via the upright;
a first spring, disposed within the chassis; and
a first cable, coupling the upright and the first spring;
a second wheel assembly, disposed laterally opposite the first wheel assembly in the first longitudinal position, the second wheel assembly comprising:
a second suspension, configured to set within one of a second operating range and a second transport position; and
a second wheel, coupled to the second suspension; and
a third wheel assembly, disposed in a second longitudinal position along the chassis, the third wheel assembly comprising:
a third suspension, configured to set within one of a third operating range and a third transport position; and
a third wheel, coupled to the third suspension.

9. The electric vehicle of claim 8, wherein the first cable is positioned such that upward movement of the upright imparts a tension on the first cable.

10. The electric vehicle of claim 8, further comprising:
a first pulley, coupled to the first cable and configured to change a tension direction of the first cable.

11. The electric vehicle of claim 10, further comprising:
a first rotational damper, coupled to the first pulley and configured to provide damping to rotation of the first pulley.

12. The electric vehicle of claim 8, further comprising:
a second cable, coupled to the upright, wherein the second cable is positioned such that downward movement of the upright imparts a tension on the second cable.

13. The electric vehicle of claim 12, wherein the second cable is coupled to a second spring.

14. The electric vehicle of claim 8, wherein the upright comprises a first upright portion and a second upright portion, wherein the first wheel is coupled to the second upright portion, and wherein the second upright portion is configured to rotate relative to the first upright portion to cause the first wheel to rotate relative to the first upright portion.

15. The electric vehicle of claim 14, further comprising:
a steering servo, coupled to the first upright portion; and
an upright linkage, coupled to the steering servo and the second upright portion, wherein the steering servo is configured to, alternatively, extend the upright linkage in a first direction and retract the upright linkage in a second direction, wherein extending the upright linkage causes the second upright portion to rotate in a first steering direction relative to the first upright portion, and wherein retracting the upright linkage causes the second upright portion to rotate in a second steering direction relative to the first upright portion.

16. An electric vehicle of claim 1, comprising:
a chassis;
a first battery module, coupled to the chassis and configured to rotate relative to the chassis;
a first wheel assembly, disposed in a first longitudinal position along the chassis, the first wheel assembly comprising:
a first suspension, configured to set within one of a first operating range and a first transport position; and
a first wheel, coupled to the first suspension, wherein the first suspension comprises:
an upright, wherein the first wheel is coupled to the first suspension via the upright;
a drum;
a first cable, coupling the upright and the drum, wherein the first cable is positioned such that upward movement of the upright imparts a tension on the first cable; and
a second cable, coupling the upright and the drum, wherein the second cable is positioned such that downward movement of the upright imparts a tension on the second cable;
a second wheel assembly, disposed laterally opposite the first wheel assembly in the first longitudinal position, the second wheel assembly comprising:
a second suspension, configured to set within one of a second operating range and a second transport position; and
a second wheel, coupled to the second suspension; and
a third wheel assembly, disposed in a second longitudinal position along the chassis, the third wheel assembly comprising:
a third suspension, configured to set within one of a third operating range and a third transport position; and
a third wheel, coupled to the third suspension.

17. The electric vehicle of claim 16, further comprising:
a drum servo, configured to rotate the drum in a first rotational direction and a second rotational direction, wherein rotation of the drum in the first rotational direction causes the upright to raise, and wherein rotation of the drum in the second rotational direction causes the upright to lower.

18. The electric vehicle of claim 16, further comprising:
a spring/damper, coupled to the drum.

19. An electric vehicle, comprising:
a chassis;
a first battery module, coupled to the chassis and configured to rotate relative to the chassis;
a first wheel assembly, disposed in a first longitudinal position along the chassis, the first wheel assembly comprising:
  a first suspension, configured to set within one of a first operating range and a first transport position; and
  a first wheel, coupled to the first suspension;
a second wheel assembly, disposed laterally opposite the first wheel assembly in the first longitudinal position, the second wheel assembly comprising:
  a second suspension, configured to set within one of a second operating range and a second transport position; and
  a second wheel, coupled to the second suspension;
a third wheel assembly, disposed in a second longitudinal position along the chassis, the third wheel assembly comprising:
  a third suspension, configured to set within one of a third operating range and a third transport position; and
  a third wheel, coupled to the third suspension; and
a first axle track, coupled to the chassis and configured to longitudinally translate along the chassis, wherein the first wheel assembly and the second wheel assembly are coupled to the first axle track.

20. The electric vehicle of claim 19, wherein the first suspension comprises a plurality of control arms.

* * * * *